Inventor
Walter H. Hannah,

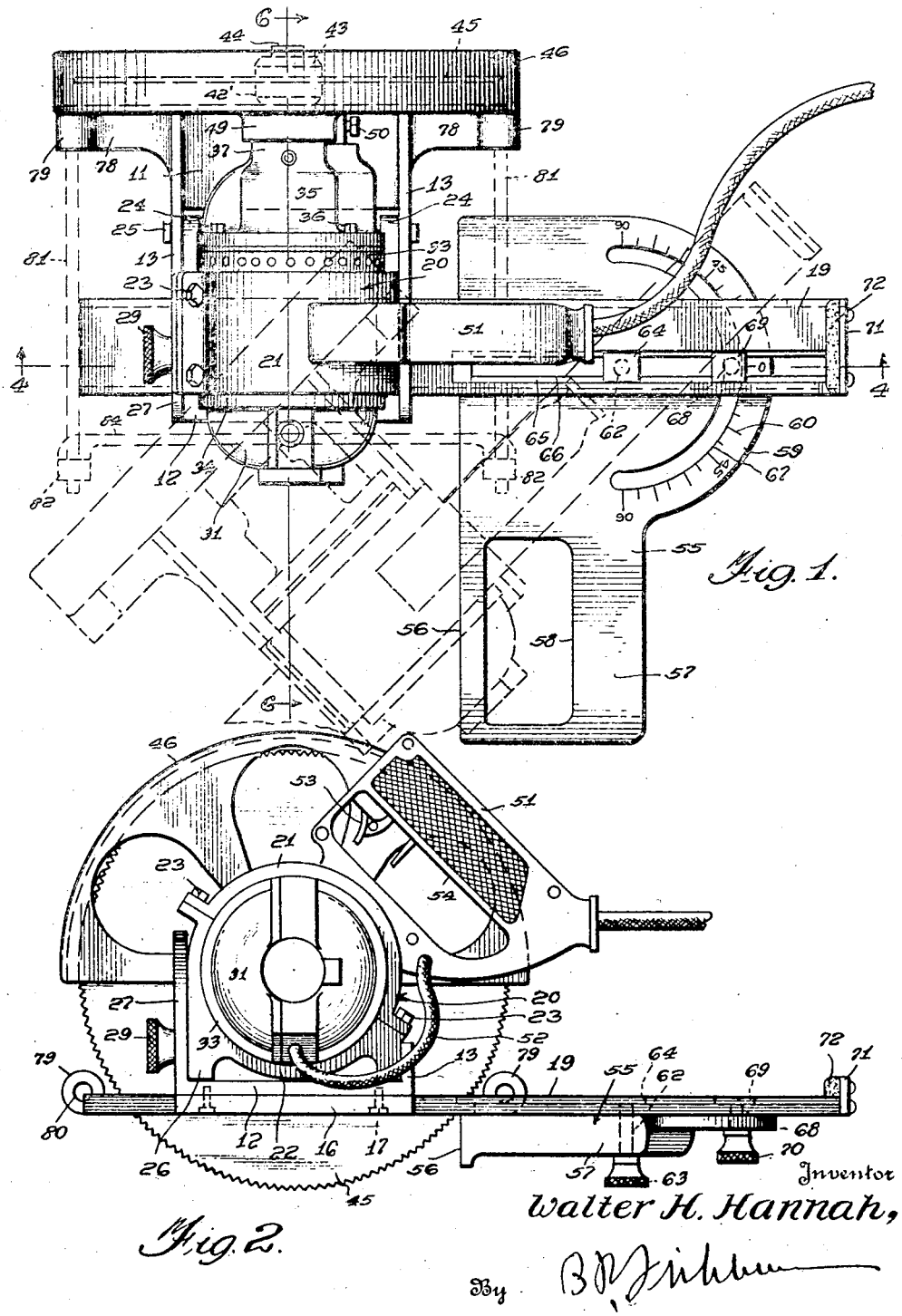

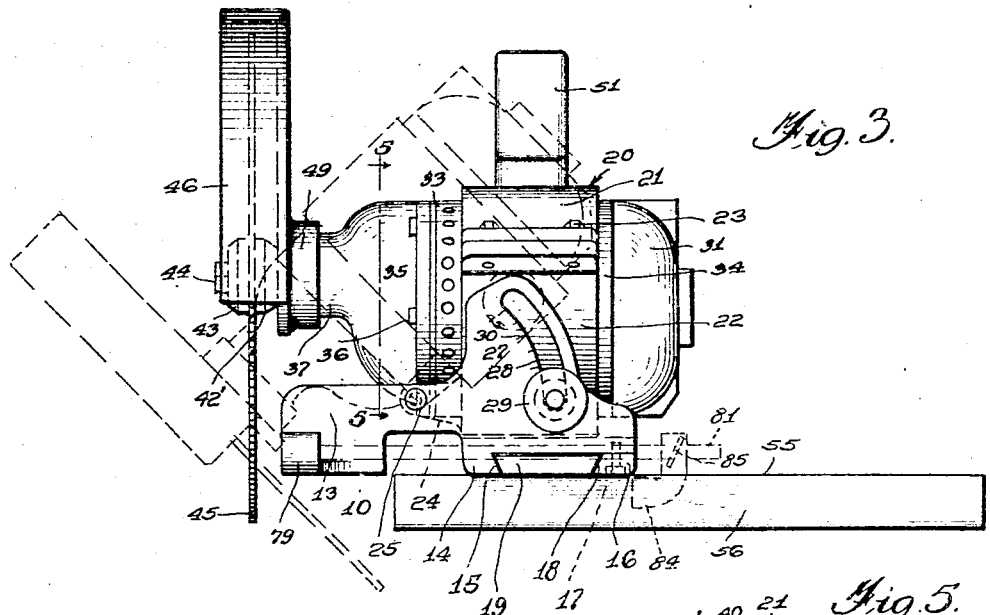
Fig. 3.
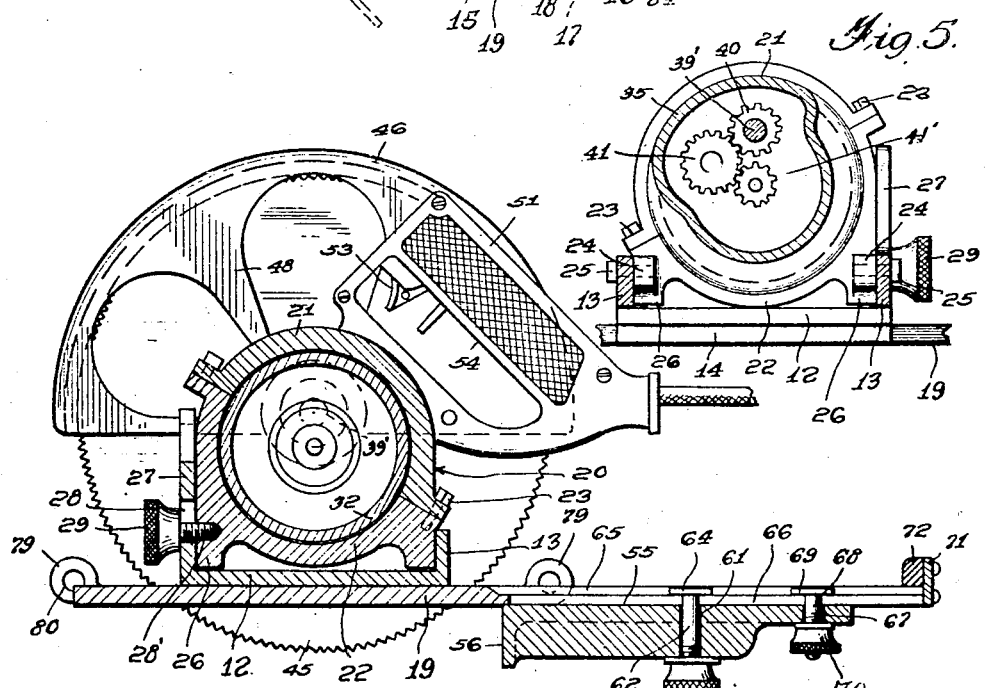
Fig. 5.
Fig. 4.
Inventor
Walter H. Hannah,
By
Attorney March 19, 1929.  W. H. HANNAH  1,706,115
POWER OPERATED SAW
Filed May 4, 1927  4 Sheets-Sheet 3

Attorney

March 19, 1929. W. H. HANNAH 1,706,115
POWER OPERATED SAW
Filed May 4, 1927 4 Sheets-Sheet 4
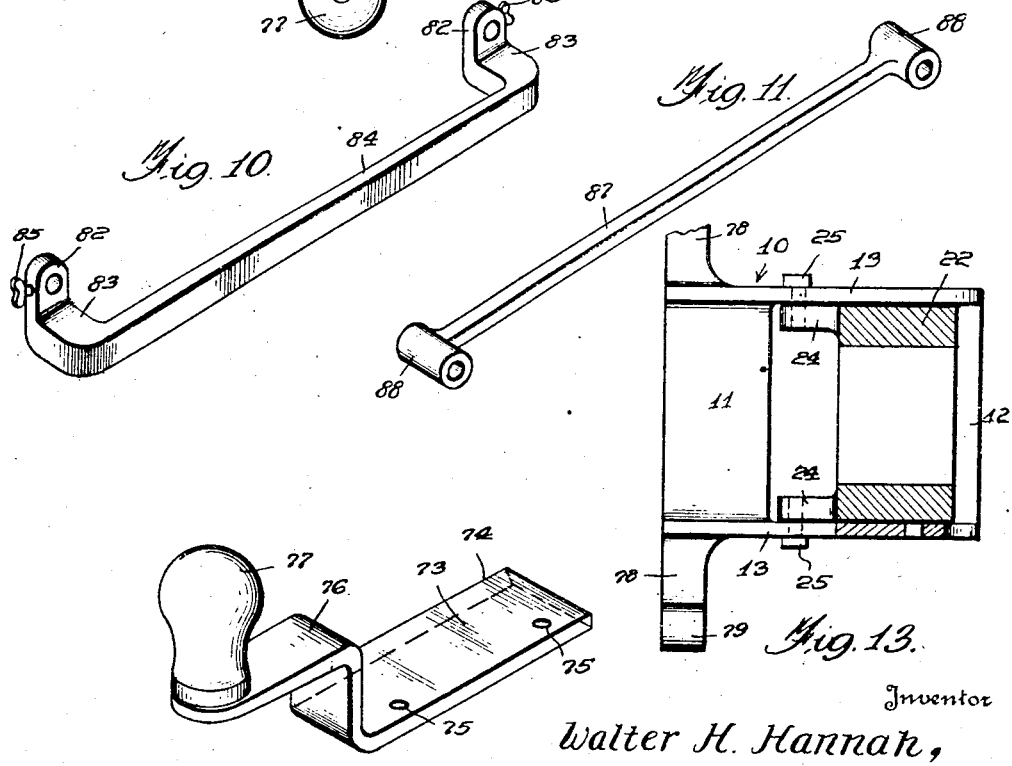

Patented Mar. 19, 1929.

1,706,115

UNITED STATES PATENT OFFICE.

WALTER H. HANNAH, OF PORTSMOUTH, OHIO.

POWER-OPERATED SAW.

Application filed May 4, 1927. Serial No. 188,830.

My invention relates to portable power driven saws.

In accordance with my invention, I provide a power driven saw, embodying a carriage. This carriage is adapted to be guided in its movement upon an angularly adjustable blade, while it may be separated from the blade and guided by other means, or moved and guided entirely by hand. A frame or support is angularly adjustably mounted upon the carriage, and the motor has its casing mounted within the frame or support to be bodily turned therein, for raising or lowering the rotary cutting element or saw. The implement is extremely simple in construction and convenient and reliable in operation. There is a large range of adjustment for making simple or compound angular cuts. When the carriage is removed from the guide means the device may be employed for cutting or ripping boards or the like. Attachments are provided to guide the carriage in its travel, either from the edge of the work being cut, or from a straight edge applied thereto.

Other objects and advantages of the invention will be apparent during the course of the following description.

Figure 6:
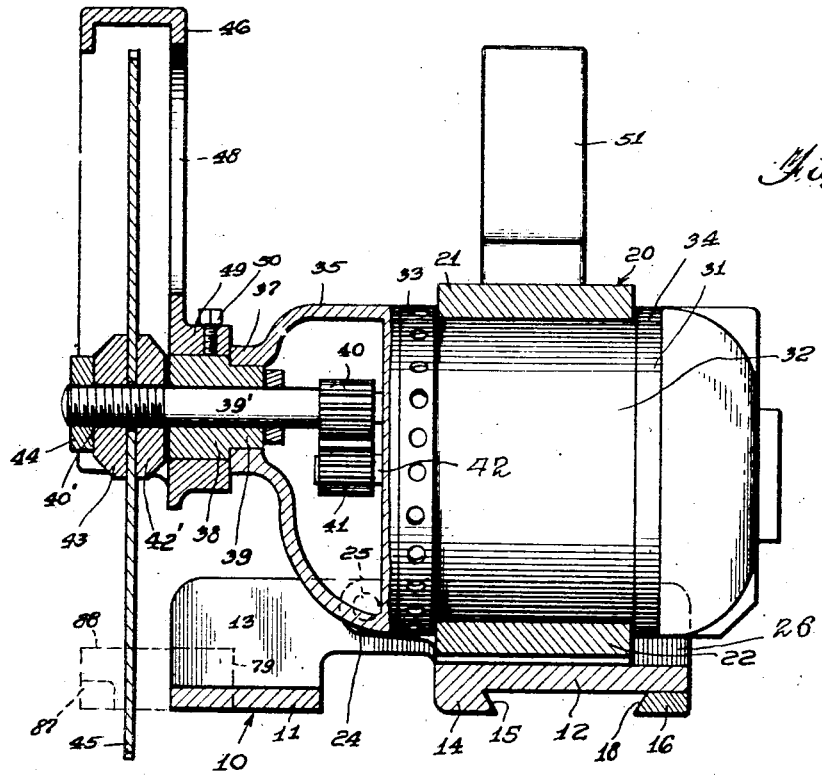
Figure 7:
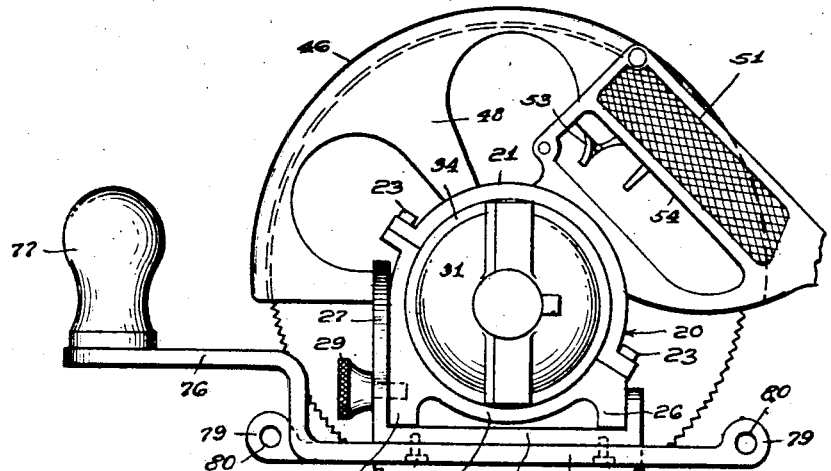

In the accompanying drawings, forming a part of this specification, and in which like numerals are employed to designate like parts throughout the same, Figure 1 is a plan view of a power driven saw embodying my invention, Figure 2 is an end elevation of the same, from the motor end of the implement, Figure 3 is a side elevation of the implement, Figure 4 is a vertical longitudinal section taken on line 4—4 of Figure 1, Figure 5 is a transverse section through the motor, taken on line 5—5 of Figure 3, Figure 6 is a longitudinal section through the motor frame and associated elements, taken on line 6—6 of Figure 1, Figure 7 is an end elevation of the machine, showing the same removed from the guide means and an additional handle applied thereto, Figure 8 is a plan view of the carriage, showing the guide means associated therewith, Figure 9 is an end elevation of the same, Figure 10 is a perspective view of the edge guide element, Figure 11 is a similar view of the straight edge guide element, Figure 12 is a perspective view of the auxiliary handle, Figure 13 is a plan view of the carriage and pivoted frame, parts being shown in horizontal section, for the purpose of illustration.

In the drawings, wherein for the purpose of illustration, is shown a preferred embodiment of my invention, the numeral 10 designates a base or carriage, as a whole, comprising longitudinal plates 11 and 12, rigidly connected by transverse rails 13, preferably formed integral therewith. The plate 12, is provided upon its lower side with a depending rib 14, which is substantially flush with the lower surface of the plate 11. The rib 14 has an inner undercut face or shoulder 15. Arranged opposite to the rib 14 is a detachable rib or guide 16, secured to the plate 12 by means of screws 17 or the like. The rib 16 has its inner face undercut, at 18, and the undercut faces 15 and 18 constitute a dovetail guide, for a blade or track 19, to be more fully explained.

The numeral 20 designates a motor carrying support or frame, embodying a ring including upper and lower ring sections 21 and 22, which are detachably connected by bolts 23. The lower ring section 22 is provided at one end with horizontally projecting knuckles 24, which are arranged within the rails 13 and are pivoted thereto, as shown at 25. The frame 20 is, therefore, adapted to be swung in a vertical plane transversely of the carriage, or transversely of the direction in which the machine is being moved, when cutting. At its opposite end, the frame 20 is provided with depending legs 26, adapted to rest upon the plate 12 of the carriage. One rail 13 is provided with an upstanding or vertical plate 27, having a curved slot 28, which is concentric with the pivots 25. One leg 26, see particularly Figure 4, is provided with a screw-threaded opening 28″, for receiving a headed clamping screw 29, operating through the slot 28. The frame 20 may, therefore, be swung upon its pivots 25, and locked in the selected angularly adjusted position, with the plate 27, by proper manipulation of the bolt 29. It is preferred that the plate 27 be provided adjacent to the slot 28 with a scale or graduation 30, indicating the angular adjustment of the motor frame.

The numeral 31 designates the casing of the motor, which motor may be of any well known or preferred construction. This motor casing has a central portion 32, which is circular in cross section, and outwardly projecting annular flanges 33 and 34 are arranged at the ends of this circular portion of the motor casing. The portion 32 of the motor casing is centrally arranged, and is mounted within the ring embodying the ring sections 21 and 22. The parts are so adjusted that by slightly unscrewing the bolts 23, the motor casing 31 may be bodily turned upon its longitudinal axis within the ring, the flanges 33 and 34 preventing the longitudinal displacement of the motor casing, and when the bolts 23 are screwed up tightly, the motor casing will have clamping engagement within the ring, and will be rigidly held thereby against movement with relation thereto.

The numeral 35 designates a gear casing which is attached to the saw end of the motor casing by bolts 36 or the like, Figure 3. This gear casing has a tubular neck or sleeve 37, which is eccentric with respect to the central longitudinal axis of the motor casing 31. A bearing, sleeve or bushing 38 has a reduced portion 39, rigidly held within the neck 37, by any suitable means. The bearing or bushing 38 receives a rotatable shaft or arbor 39′, suitably held against longitudinal displacement. The shaft 39′ carries upon its inner end a gear 40, rotatable therewith which is driven by a gear 41. This gear 41 is driven by a gear 41′ rigidly mounted upon the armature shaft 42, which is concentric with the central longitudinal axis of the motor casing.

The outer end of the shaft 39′ is screw-threaded, as shown at 40′, and this screw-threaded portion terminates a slight distance outwardly of the bushing or bearing 38. An inner clamp collar 42′ has a screw-threaded opening for receiving the screw-threaded portion 40′ of the shaft 39. An outer clamp collar 43 is provided with a screw-threaded opening to receive the screw-threaded portion 40′ and a lock nut 44 is arranged upon the screw-threaded portion 40′ outwardly of the clamp collar 43. A circular saw 45 has a central opening to receive the screw-threaded portion 40′ of the shaft 39, but has no screw-threaded engagement with the same. The saw 45 is clamped to the shaft 39 for rotation therewith, through the medium of the inner and outer collars 42′ and 43 as is obvious. The saw 45 is readily removable from the shaft or arbor 39 so that other types of saws or rotary cutters may be used.

The numeral 46 designates a semi-circular saw guard, extending over the top of the saw, and having radial arms 48, formed integral with a hub 49. This hub is pivotally mounted upon the bearing or bushing 38 and may be clamped thereto by a bolt 50 or the like.

The upper ring section 21 has a handle 51 rigidly secured thereto, and this handle encloses a suitable switch device, which opens and closes the circuit passing to the motor. The circuit includes a cable 52, Figure 2, passing from the handle to the motor casing. The switch device, which may be of any well known or preferred type, is actuated by a trigger 53 arranged within the handle opening 54, and spring pressed to normally retain the outer position. When the trigger 53 is in the outer position the motor circuit is open, but when this trigger is depressed, when the operator grasps the handle 51, the switch device will be closed and the motor circuit completed, to drive the motor.

The blade or track 19 is mounted upon a cross head 55, having a straight edge 56 and a hand grip 57, formed by an opening 58. The cross head also has a segmental portion 59, having a scale or graduation 60, to indicate the angular position that the blade 19 has with relation to the cross head. The cross head is provided with an opening 61, to pivotally receive a guide bolt 62, carrying beneath the cross head a milled nut 63, and above the cross head a rectangular head 64, which is slidable within the enlarged portion 65 of a longitudinal slot 66. The head 64 of the bolt is disposed at a slight elevation beneath the upper surface of the blade or track 19, so that it will not strike the bottom of the carriage 10. The segmental portion 59 is provided with a curved slot 67, receiving a bolt 68, also operating within the slot 66. This bolt 68 has a rectangular head 69, engaging within the enlarged portion 65 of the slot 66. The bolt 68 is provided at its lower screw-threaded end with a milled nut 70. It is thus seen that the blade or track 19 may be turned upon the bolt 61 for angular adjustment with respect to the cross head 55, and may also be longitudinally adjusted with respect to the cross head. The blade 19 is provided at its rear end with an upturned flange 71, carrying a buffer 72, formed of rubber or the like and adapted to be engaged by the rear end of the carriage 10. By moving the carriage rearwardly upon the blade or track 19, the carriage will engage the buffer 72 and this in turn will move the blade or track 19 rearwardly.

When it is desired to use the saw independently of the guide means including the blade 19 and associated elements, the rib 16 is detached from the plate 12, and the carriage removed from the blade 19. An auxiliary plate 73 is now placed in the recess previously occupied by the blade 19, and has a beveled edge 74, to engage with the beveled edge 15. This auxiliary plate has openings 75, adapted for alinement with the openings receiving the screws 17, which screws are employed to secure the auxiliary plate in place upon the plate 12. The lower face of the auxiliary plate is flush with the faces of the rib 14 and plate 11 and the heads of the screws 17 are countersunk within the plate 73. The auxiliary plate 73 carries an upwardly offset handle portion 76, equipped with a knob 77.

As more clearly shown in Figure 8, the plate 11 of the carriage 10 is provided at its ends with outwardly extending arms 78, having heads 79, provided with screw-threaded openings 80. These screw-threaded openings are adapted to detachably receive the screw-threaded ends of rods 81, adjustably receiving thereon upstanding apertured ears 82, formed upon the lateral extensions 83 of a guide element 84, adapted to project downwardly below the surface of the work being cut, and travel in engagement with the edge thereof. The knuckles 82 are equipped with clamping bolts 85, adapted to lock the guide 84 to the rods 81, in selected adjusted positions. It is preferred that the rods 81 be provided with a scale or graduation 86, in inches and fractions thereof, for indicating the adjustment of the edge guide 84.

The numeral 87 designates a straight edge guide, arranged in the plane of the carriage, to engage a straight edge which may be nailed upon the upper surface of the work being cut. The straight edge guide 87 is equipped at its ends with apertured heads 88, for receiving screws 89, adapted to engage within the head 79, and detachably clamp the guide 87 to the same. The rotary saw 45 operates between the guide 87 and the plate 11, as is obvious.

The operation of the device is as follows:

When it is desired to cut work at angles, either simple or compound, such as the cutting of rafters or the like, the carriage 10 is mounted upon the blade 19 and may be shifted longitudinally thereof. The straight edge 56 of the cross head 55 is placed in engagement with the edge of the work. If the work is to be cut at a simple angle the blade 19 is properly angularly adjusted upon the cross head 57 and locked thereto in the adjusted position by manipulation of the bolts 61 and 68. The carriage 10 with the elements supported thereby, is now moved longitudinally of the blade 19, by the operator grasping the handle 53, and manually advancing the carriage. The saw is then advanced into the work, as is obvious. The elevation of the saw, or the depth that the same will cut, is regulated by bodily turning the motor casing 31 upon its longitudinal axis, which raises and lowers the saw due to the eccentric arrangement of the shaft or arbor 39. The motor casing is clamped to the frame 20 after the turning adjustment thereof, by manipulation of the bolts 23. The blade 19 is not only angularly adjustable upon the cross head 57, but is also longitudinally adjustable thereon, by virtue of the slot 66 and bolts operating therein. The rearward longitudinal adjustment of the blade, when the bolts 61 and 68 are loosened may be effected by the longitudinal movement of the carriage 10 upon the blade 19, so that the carriage engages the buffer 72, and further rearward movement of the carriage will effect the rearward shifting movement of the blade 19.

When the device is to be used for straight work, such as ripping, etc., the carriage 10 is removed from the blade 19, which may be effected by sliding the carriage off of the forward end of the blade 19. The rib 16 is now removed and the auxiliary blade 73 secured to the plate 12 with its edge engaging with the edge 15. The blade 73 is flush with the rib 14 and plate 11, and these parts constitute sliding surfaces for the carriage. The knob 77 is now located in advance of the motor, as clearly shown in Figure 7. The device may now be employed in doing free hand sawing. The rods 81 may now be attached to the heads 79 and the guide 84 mounted upon these rods and suitably adjusted thereon. The saw may now be brought to the work, and fed longitudinally thereof with the guide 84 engaging the edge of the work. A straight edge may be secured to the upper surface of the work and the straight edge guide 87 may be attached to the heads 79 and engaged with the straight edge. The guide 87 may be attached to the heads 79, with or without the guide 84.

It is to be understood that the form of my invention, herewith shown and described, is to be taken as a preferred example of the same, and that various changes in the shape, size and arrangement of parts may be resorted to without departing from the spirit of my invention, or the scope of the subjoined claims.

Having thus described my invention, I claim:

1. In a power operated portable saw, a shiftable carriage, a frame embodying a ring portion, means for angularly adjustably mounting the ring portion upon the carriage, a handle secured to the ring portion, a motor embodying a casing having a cylindrical intermediate portion mounted within the ring portion of the frame so that the motor casing may be turned upon its longitudinal axis within the ring portion, the casing projecting upon opposite sides of the ring portion, a shaft carried by the motor casing and arranged eccentrically with relation to said ring portion, said shaft being driven by the motor and raised and lowered by turning the motor casing upon its longitudinal axis, and a saw carried by the shaft.

2. In a power operated portable saw, a carriage, a frame angularly adjustably mounted upon the carriage and embodying a ring portion formed in sections, adjustable means connecting said sections, a motor including a casing having a cylindrical intermediate portion mounted within the ring portion whereby the motor may be turned upon its longitudinal axis and clamped to the ring portion, the motor casing projecting outwardly beyond the opposite side of the ring portion in the adjusted position, a shaft carried by the motor and disposed eccentrically with respect to the ring portion, said shaft being driven by the motor and raised and lowered by turning the motor casing upon its longitudinal axis, and a saw mounted upon the shaft.

3. In a power operated portable saw, a carriage, a frame pivotally mounted upon the carriage to swing in a direction transversely of the travel of the carriage in the cutting operation said frame including a ring portion, adjustable means to lock the frame to the carriage at a selected angular position, a motor casing extending transversely of the direction of travel of the saw and pivotally mounted within the ring portion so that it may be turned upon its longitudinal axis with respect to the ring portion, said motor casing extending beyond the opposite sides of the ring portion, a shaft extending longitudinally of the motor casing and carried thereby and disposed eccentrically with relation to the ring portion, said shaft being driven by the motor and raised and lowered by turning the motor upon its longitudinal axis, and a saw mounted upon the shaft.

4. In a power operated portable saw, a cross head, a blade angularly and longitudinally adjustably mounted upon the cross head, a carriage having guiding engagement with the blade to move longitudinally thereof, a frame pivotally mounted upon the carriage to swing in a plane transversely of the blade, means to lock the frame to the carriage in a selected angular position, a motor including a motor casing mounted upon the frame and having its longitudinal axis extending transversely of said blade, a shaft carried by the motor and extending longitudinally of the longitudinal axis of the motor and driven by the motor, and a saw mounted upon said shaft.

5. In a power operated portable saw, a cross head, a blade angularly and longitudinally adjustably mounted upon the cross head, a carriage having guiding engagement with the blade to move longitudinally thereof, a frame pivotally mounted upon the carriage to swing in a plane transversely of the blade, means to lock the frame to the carriage in a selected angular position, a motor including a motor casing mounted upon the frame and having its longitudinal axis extending transversely of said blade, a shaft carried by the motor and extending longitudinally of the longitudinal axis of the motor and driven by the motor, a buffer secured to the rear end of the blade and adapted to be engaged by the carriage when it is shifted rearwardly to shift the blade rearwardly, and a saw mounted upon said shaft.

6. In a power operated portable saw, a cross head, a blade angularly and longitudinally adjustably mounted upon the cross head, a carriage having guiding engagement with the blade to move longitudinally thereof, a part carried by the blade and arranged to be engaged by the carriage when the carriage is shifted rearwardly, to shift the blade rearwardly, a motor mounted upon the carriage, a rotatable shaft carried and driven by the motor, and a saw mounted upon the shaft.

7. In a power operated portable saw, a carriage, heads mounted upon the carriage and having longitudinal screw-threaded openings extending transversely of the direction of travel of the carriage, transverse rods having their ends screw-threaded for detachable engagement within the screw-threaded openings, an edge guide adjustably mounted upon the rods, a straight edge guide adapted to be arranged upon the opposite sides of the heads, screws carried by the straight edge guide and adapted to engage within the screw-threaded opening of said heads, a motor mounted upon the carriage and extending transversely thereof, a shaft carried by the motor and driven thereby, and a saw mounted upon the shaft.

8. In guide means of the character described, a carriage provided upon its lower surface with a rib having an undercut edge, a second rib having an undercut edge, spaced from the first named rib and detachably secured to the carriage, said ribs being adapted for engagement with a guide element, a supplemental plate adapted to be mounted upon the bottom of the carriage when the detachable rib is removed and having a beveled edge to engage with the undercut edge of the permanent rib, and a handle carried by the supplemental plate.

9. In guide means of the character described, a carriage provided with longitudinally projecting extensions having heads, said heads having screw-threaded openings extending longitudinally thereof, rods arranged upon one side of the heads and having their ends screw-threaded to engage within the screw-threaded openings of the heads, an edge guide carried by the ribs, a straight edge guide arranged upon the opposite sides of the heads, screws carried by the straight edge guide and adapted to engage within the screw-threaded openings of the heads.

In testimony whereof I affix my signature.

WALTER H. HANNAH.